(12) United States Patent
Tung (10) Patent No.: US 8,260,288 B2
(45) Date of Patent: Sep. 4, 2012

(54) METHOD AND APPARATUS FOR GENERATING A UNIQUE IDENTIFIER FOR A WIRELESS DEVICE

(76) Inventor: Henti Tung, San Diego, CA (US)

( * ) Notice: Subject to any disclaimer, the term of this patent is extended or adjusted under 35 U.S.C. 154(b) by 16 days.

(21) Appl. No.: 11/158,446

(22) Filed: Jun. 21, 2005

(65) Prior Publication Data

US 2006/0154646 A1 Jul. 13, 2006

Related U.S. Application Data

(60) Provisional application No. 60/643,904, filed on Jan. 13, 2005.

(51) Int. Cl.
*H04W 4/00* (2009.01)

(52) U.S. Cl. .............. 455/432.3; 455/432.1; 455/435.2; 455/422.1; 455/452.1; 455/450; 370/441; 370/335; 370/342; 370/331; 370/436

(58) Field of Classification Search .................. 455/515, 455/516, 517, 411, 561, 432.3, 432.1, 435.2, 455/422.1, 452.1, 450; 370/441, 335, 342, 370/331, 436, 390, 320, 209
See application file for complete search history.

(56) References Cited

U.S. PATENT DOCUMENTS

| | | | | |
|---|---|---|---|---|
| 5,608,781 | A * | 3/1997 | Seiderman | 455/410 |
| 7,130,626 | B2 * | 10/2006 | Bender et al. | 455/425 |
| 2003/0054799 | A1 * | 3/2003 | Shin | 455/411 |
| 2004/0242222 | A1 * | 12/2004 | An et al. | 455/423 |
| 2004/0259596 | A1 * | 12/2004 | Rajkotia et al. | 455/561 |
| 2006/0135161 | A1 * | 6/2006 | Jiang et al. | 455/436 |
| 2007/0082669 | A1 * | 4/2007 | Colban | 455/433 |
| 2008/0287101 | A1 * | 11/2008 | An et al. | 455/411 |

FOREIGN PATENT DOCUMENTS

| EP | 1473865 | | 3/2004 |
|---|---|---|---|
| EP | 1473865 | A1 * | 4/2004 |

OTHER PUBLICATIONS

International Preliminary Report on Patentability(IPRP)—PCT/US2006/001423, International Search Authority—European Patent Office—Jul. 17, 2007.
Written Opinion (WO)—PCT/US2006/001423, International Search Authority—European Patent Office—Jul. 13, 2007.
International Search Report—PCT/US2006/01423, International Search Authority—European Patent Office—May 9, 2006.
"3G Mobile Equiptment Identifier (MEID)", $3^{rd}$ Generation Partnership Project 2 "3GPP2" S.R0048-A; Version 1.0; Aug. 22, 2003.
David Crowe; "MEID Standards Update"; TIA Committee TR-45, (Aug. 2004).

* cited by examiner

*Primary Examiner* — Ajit Patel
*Assistant Examiner* — Khai M Nguyen
(74) *Attorney, Agent, or Firm* — Timothy F. Loomis; Won Tae Kim (57) ABSTRACT

A base station receives a first identifier (e.g., pseudo ESN) from the wireless device and assigns an index to the wireless device. The base station generates a second identifier (e.g., a dynamic ESN) for the wireless device based on the first identifier and the index. The second identifier is unique among all wireless devices communicating with the base station and may also be unique among other wireless devices communicating with other base stations. The base station generates a code (e.g., a PLCM) for the wireless device based on the second identifier. The wireless device generates the second identifier and the code in similar manner. The second identifier and code may be used for communication between the base station and the wireless device.

29 Claims, 7 Drawing Sheets

METHOD AND APPARATUS FOR GENERATING A UNIQUE IDENTIFIER FOR A WIRELESS DEVICE

RELATED APPLICATIONS

The present application claims the benefit of U.S. Provisional Application Patent No. 60/643,904 filed Jan. 13, 2005.

BACKGROUND

I. Field

The present invention relates generally to communication, and more specifically to techniques for generating an identifier for a wireless device in a wireless communication network.

II. Background

Wireless devices such as cellular phones are widely used throughout the world for wireless communication. Each wireless device is typically assigned a globally unique equipment identifier that is embedded or inscribed into the wireless device by the manufacturer. The equipment identifier is used to identify the wireless device to a wireless network, for fraud detection, and for other purposes. The wireless device is also associated with a subscription identifier, which is an identifier used by the wireless network for the wireless device. The equipment identifier may be a serial number for the wireless device, and the subscription identifier may be a telephone number for the wireless device.

Electronic Serial Number (ESN) is one type of equipment identifier and is used for wireless devices in ANSI TIA/EIA 41 "Family of Standards", which includes TIA/EIA-553 for Advanced Mobile Phone Service (AMPS), TIA/EIA-95 and TIA/EIA/IS-2000 for Code Division Multiple Access (CDMA), EIA/TIA-691 for Narrowband AMPS (NAMPS), and TIA/EIA-136 for Time Division Multiple Access (TDMA). ESN is a 32-bit number that is unique for each wireless device in TIA/EIA 41. Because of its relatively small 32-bit size, all of the available ESNs are expected to be exhausted in the year 2005. The use of ESN in CDMA is described in various documents for IS-2000 Releases 0, A, B and C, which are publicly available.

Mobile Equipment Identifier (MEID) is a new type of equipment identifier and is slated to replace ESN. MEID is a 56-bit number that is unique for each wireless device. MEIDs may be assigned to new wireless devices for AMPS, CDMA, TDMA, and other systems. The use of MEID in CDMA is described in various documents for IS-2000 Release D, which are publicly available.

In CDMA, an ESN is used in its entirety to generate a 42-bit Public Long Code Mask (PLCM), which is then used for wireless communication. Because ESNs are unique for all wireless devices assigned with ESNs, PLCMs generated based on ESNs are also unique. Unique PLCMs are important to ensure that communications for different wireless devices can be received and that these communications will not be overheard by unauthorized listeners.

IS-2000 Release D describes a method for generating a pseudo-ESN (pESN) based on an MEID and then generating a PLCM based on the pESN. The mapping from the MEID to the pESN is not unique. Hence, it is possible for two wireless devices with different MEIDs to map to the same pESN. Such an event is called a collision. Multiple wireless devices would have the same PLCMs whenever a collision occurs. Privacy may be compromised and other detrimental effects may also occur as a result of the collision.

There is therefore a need in the art for techniques to generate unique identifiers for wireless devices.

SUMMARY

Techniques for generating a unique identifier for a wireless device based on an identifier provided by the wireless device and an index assigned by a base station are described herein. These techniques may be used for various wireless communication networks and various applications.

A base station receives a first identifier (e.g., a pESN, which may have been derived based on an MEID) from a wireless device and assigns an index to the wireless device. The index may be a value that is selected or derived in various manners, as described below. The base station generates a second identifier (e.g., a dynamic ESN) for the wireless device based on the first identifier and the index. The second identifier is unique among all wireless devices communicating with the base station and may also be unique among other wireless devices communicating with other base stations. The base station also generates a code (e.g., a PLCM) for the wireless device based on the second identifier. The wireless device derives the second identifier and the code in similar manner as the base station. The second identifier and/or code may thereafter be used for communication between the base station and the wireless device.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
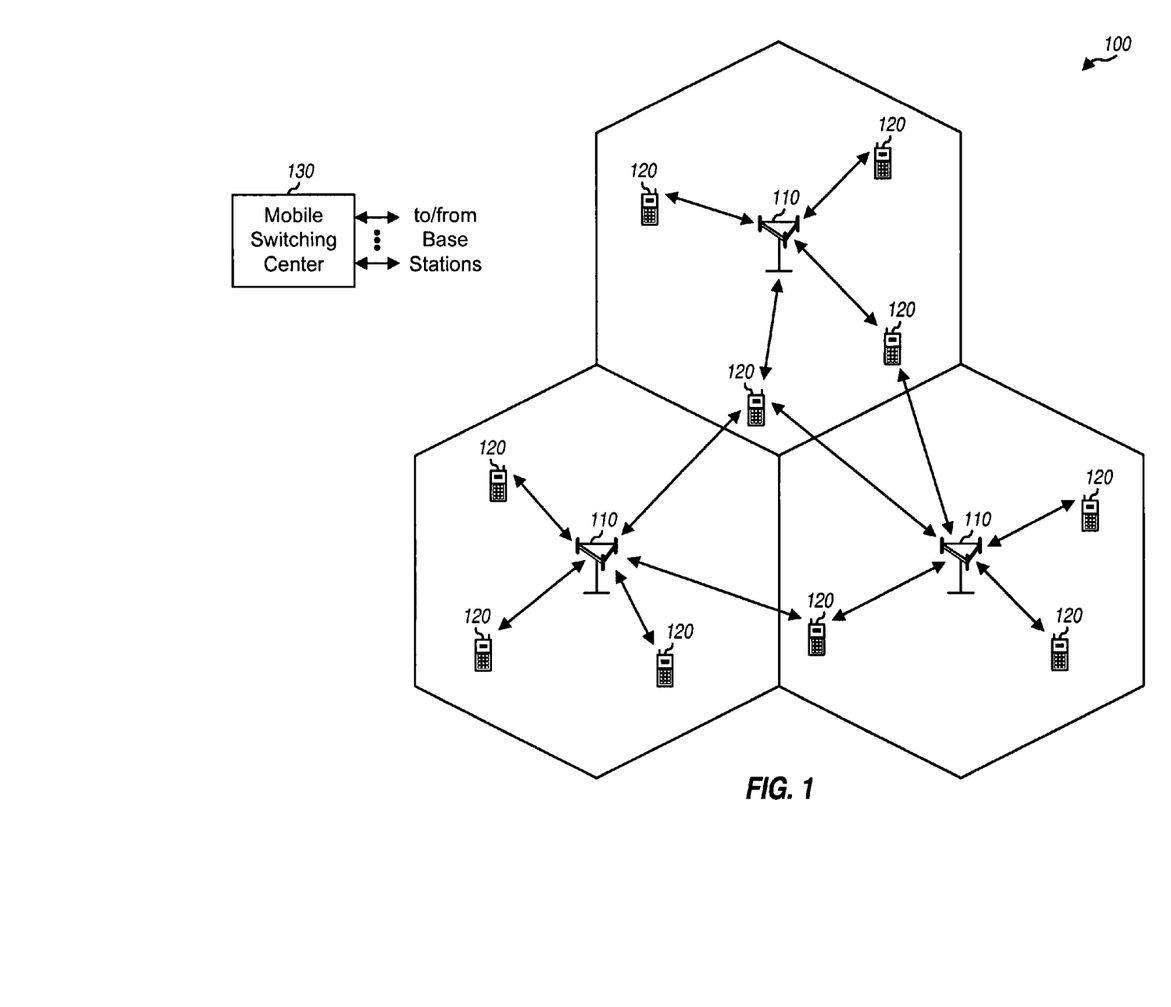
FIG. 1 shows a wireless communication network.

FIG. 1 shows a wireless communication network 100. The terms "network" and "system" are often used interchangeably. Network 100 includes base stations 110 that provide communication services for wireless devices 120. A base station is generally a fixed station and may also be called a base transceiver station (BTS), a Node B, an access point, or some other terminology. A wireless device may be fixed or mobile and may also be called a mobile station (MS), a mobile equipment (ME), a user equipment (UE), a user terminal, a subscriber unit, or some other terminology. The wireless devices may be dispersed throughout the network.

Each wireless device may communicate with zero, one, or multiple base stations at any given moment. This depends on whether the wireless device is active and whether the wireless device is in handoff. Handoff or handover refers to a process of transferring or handing over a wireless device from one base station to another base station. A mobile switching center (MSC) 130 couples to base stations 110 and provides coordination and control for these base stations. An MSC may also be called a radio network controller (RNC) or some other terminology.

Network 100 may be a CDMA network that may implement a radio access technology (RAT) such as cdma2000 or Wideband-CDMA (W-CDMA). cdma2000 covers IS-2000, IS-856, and IS-95 standards. Network 100 may also be a TDMA network that may implement a RAT such as Global System for Mobile Communications (GSM). These RATs and standards are well known in the art. cdma2000 is described in documents from a consortium named "3rd Generation Partnership Project 2" (3GPP2). W-CDMA and GSM are described in documents from a consortium named "3rd Generation Partnership Project" (3GPP). 3GPP and 3GPP2 documents are publicly available. For clarity, much of the description below is for cdma2000, which is simply referred to as "CDMA".

As noted above, ESNs are assigned to many existing wireless devices in TIA/EIA 41 and are used for various purposes. For example, an ESN may be used (1) to specifically address a wireless device, (2) to generate a PLCM, (3) to randomize the start of transmission in a CDMA network, (4) to serve as an authentication signature, (5) to derive a default International Mobile Subscriber Identity (IMSI) used for communication with a GSM or UMTS network, (6) to serve as a pseudo-random number (PN) generator for timer-based registration in CDMA, (7) to enable service provisioning over the air, and (8) for other purposes. For clarity, much of the description below covers ESN and generation of PLCM with ESN. In the following description, "ESN" generically refers to any form of ESN such as true ESN (tESN), pseudo ESN (pESN), and dynamic ESN (dESN). A true ESN is an ESN that is assigned by a manufacturer to a wireless device. The other types of ESN are generated based on some other identifiers and/or parameters, as described below, and are used as substitutes for the true ESN when the true ESN is not available.

Figure 2:
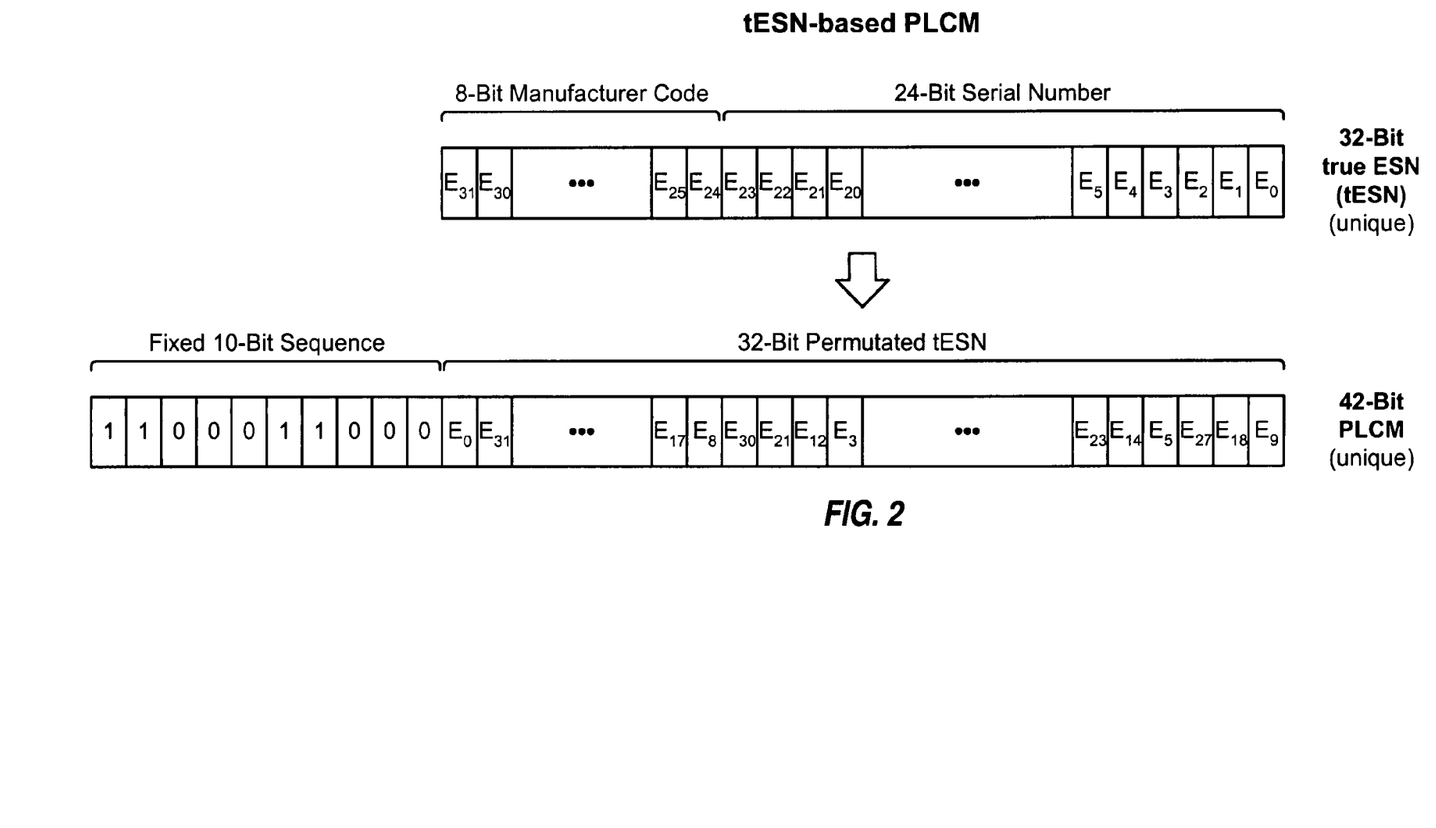
FIG. 2 shows a true ESN (tESN) and a tESN-based PLCM.

FIG. 2 shows the format of a 32-bit true ESN. The true ESN has several formats depending on the value of the 8 most significant bits (MSBs). If the 8 MSBs of the true ESN fall within a range of 9 to 127 and 129 to 254 (decimal), then the true ESN includes (1) an 8-bit manufacturer code that is formed by the 8 MSBs of the true ESN and (2) a 24-bit serial number that is formed by the 24 least significant bits (LSBs) of the true ESN. The 32 bits of the true ESN are labeled as $E_0$ through $E_{31}$, with $E_0$ being the LSB and $E_{31}$ being the MSB. If the 8 MSBs fall within a range of 0 to 8 (decimal), then the true ESN includes a 14-bit manufacturer code formed by the 14 MSBs and an 18-bit serial number formed by the 18 LSBs. Values of 128 and 255 for the 8 MSBs are reserved.

FIG. 2 also illustrates the generation of a 42-bit PLCM based on the 32-bit true ESN and using a tESN-based PLCM scheme described in IS-2000 Release 0 and later. The 10 MSBs of the PLCM are set to a fixed 10-bit sequence of '1100011000'. The 32 LSBs of the PLCM are set to a permutated tESN, which includes all 32 bits of the true ESN but arranged in a permutated order. The permutation is described in a document TIA/EIA/IS-2000.5-0. The true ESN is unique for each wireless device that is assigned with one. The PLCM generated based on the true ESN is also unique for each wireless device since all 32 bits of the true ESN are used to generate the PLCM. The tESN-based PLCM scheme is the only way to generate a PLCM for IS-2000 Releases 0, A and B.

As noted above, MEIDs will be assigned to newer wireless devices in TIA/EIA 41 once the available true ESNs are exhausted. To maintain backward compatibility, a 32-bit pseudo ESN (pESN) may be derived from a MEID and used as a substitute for a true ESN for wireless communication and for other applications where an ESN is needed.

Figure 3:
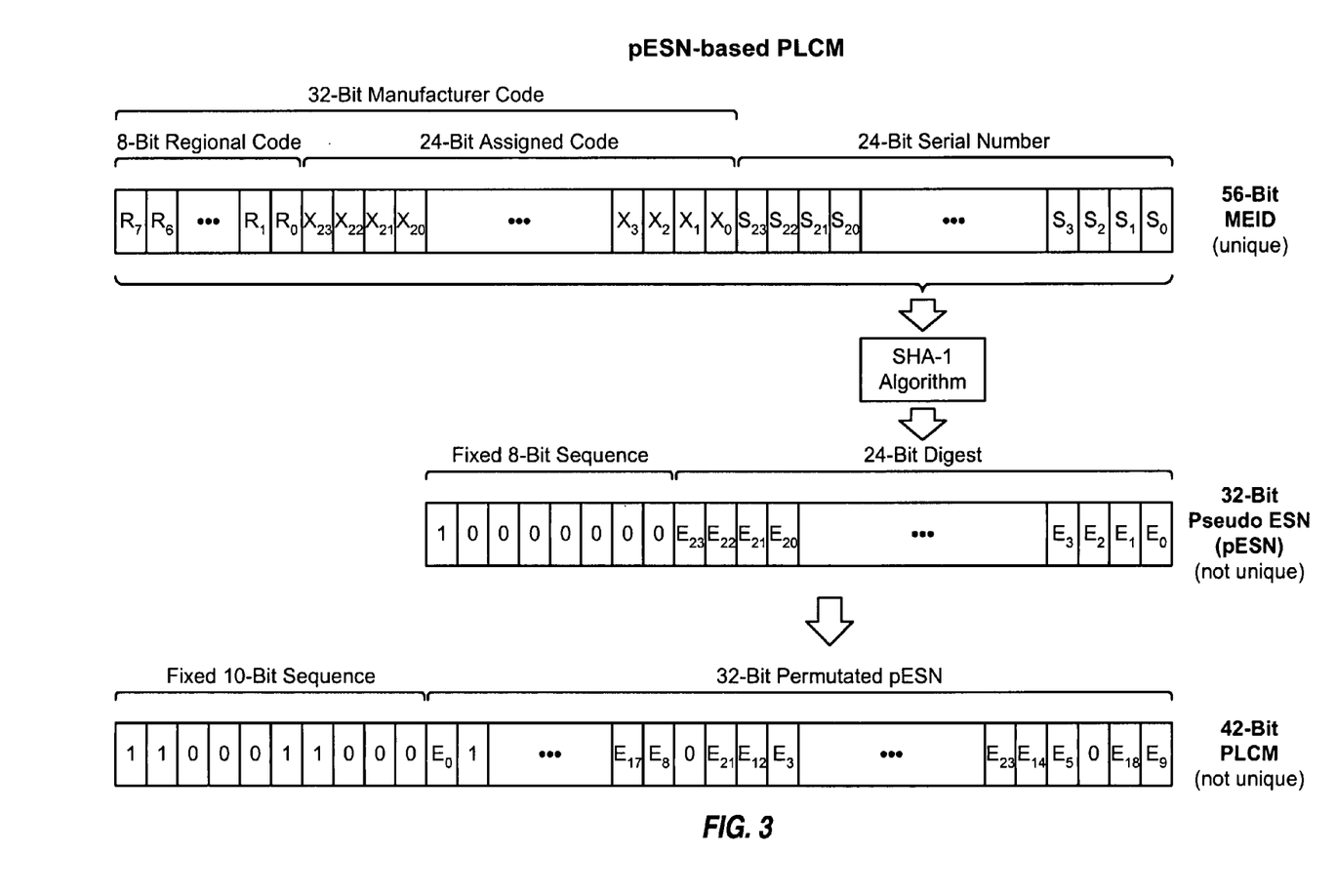
FIG. 3 shows an MEID and a pESN-based PLCM.

FIG. 3 shows the format of a 56-bit MEID. The MEID has 14 hexadecimal digits, with each hexadecimal digit being composed of 4 bits and having a range of 0 through 15 (decimal). The eight most significant hexadecimal digits are for a manufacture code, and the six least significant hexadecimal digits are for a serial number that is assigned by the manufacturer to a wireless device. The manufacture code includes two hexadecimal digits for a regional code and six hexadecimal digits for a value assigned to the manufacturer.

FIG. 3 also illustrates the generation of a 32-bit pESN based on the 56-bit MEID as described in an IS-2000 Release D document C.S0005-D, entitled "Upper Layer (Layer 3) Signaling Standard for cdma2000 Spread Spectrum Systems." All 56 bits of the MEID are passed through a SHA-1 algorithm that generates a 160-bit message digest or hash, where SHA stands for Secured Hash Algorithm. The 24 LSBs of the pESN are set to the 24 LSBs of the 160-bit message digest generated. The 8 MSBs of the pESN are set to a fixed 8-bit sequence of '10000000', which is 128 in decimal and 0x80 in hexadecimal. A manufacture code value of 0x80 is reserved and not used for any true ESN. Hence, the pESN will not match any true ESN because the pESN has a manufacturer code of 0x80 that is not assigned to any true ESN. However, the pESN is not unique for all wireless devices since multiple MEIDs may hash to the same 24-bit digest.

FIG. 3 also illustrates the generation of a 42-bit PLCM based on the pESN using a pESN-based PLCM scheme described in IS-2000 Release D. The pESN is used in the same manner as the tESN to generate the PLCM, as described above for FIG. 2 and also shown in FIG. 3. The PLCM generated from the pESN is not unique for all wireless devices since the pESN is not unique. A collision occurs whenever multiple MEIDs map to the same pESN and hence also map to the same PLCM.

The ESN may be used for various purposes, as described above. The PLCM may also be used for various purposes such as (1) to set up a traffic channel for a wireless device, (2) to scramble data prior to transmission over the air, and (3) for other purposes. It is important that the PLCM is unique to ensure that the over-the-air transmission will not be overheard by unauthorized listeners.

Several solutions have been formulated in IS-2000 Releases C and D to address the issue of non-unique PLCMs generated based on MEIDs using the pESN-based scheme described in FIG. 3. These solutions include BS-specified PLCM, MEID-based PLCM, IMSI_M-based PLCM, and IMSI_T-based PLCM schemes. For the BS-specified PLCM scheme, which is described starting in IS-2000 Release C, a base station assigns a PLCM to a wireless device for use during a call with the base station. The base station can ensure uniqueness for all PLCMs assigned to the wireless devices communicating with that base station. For the MEID-based PLCM scheme, a MEID is used to generate a 39-bit message digest, which is then used to generate a 42-bit PLCM. The PLCM generated by the MEID-based PLCM scheme is still not unique, but the possibility of collision is much less than with the pESN-based scheme since a 39-bit message digest is used to generate the PLCM instead of a 24-bit message digest. For the IMSI_M-based PLCM and IMSI_T-based PLCM schemes, a MIN-based IMSI (IMSI_M) and a true IMSI (IMSI_T) are used to generate PLCMs, where MIN stands for mobile identification number. IMSI is typically a telephone number and is unique for a given subscription area.

It is unlikely that all existing CDMA base stations will be upgraded to IS-2000 Release C or D before all of the available true ESNs are exhausted. In the mean time, there will be wireless devices assigned with MEIDs that will need to operate in wireless networks supporting IS-2000 Releases 0, A and B, which are also called pre-Release C/D wireless networks. These wireless devices would need to use their MEIDs and pESNs to operate in pre-Release C/D wireless networks and would encounter non-unique pESNs and non-unique PLCMs generated using the pESN-based PLCM scheme shown in FIG. 3.

In an aspect, a unique PLCM may be generated based on a non-unique pESN and a dynamic index assigned by a base station. The base station may assign dynamic indices to wireless devices that (1) are communicating with the base station, (2) are assigned with MEIDs, and (3) need to use ESNs for any purpose. The wireless device may generate a 32-bit dynamic ESN (dESN) based on its MEID and the dynamic index assigned by the base station. The wireless device may then use the dESN to generate a unique PLCM for communication with the base station.

Figure 4:
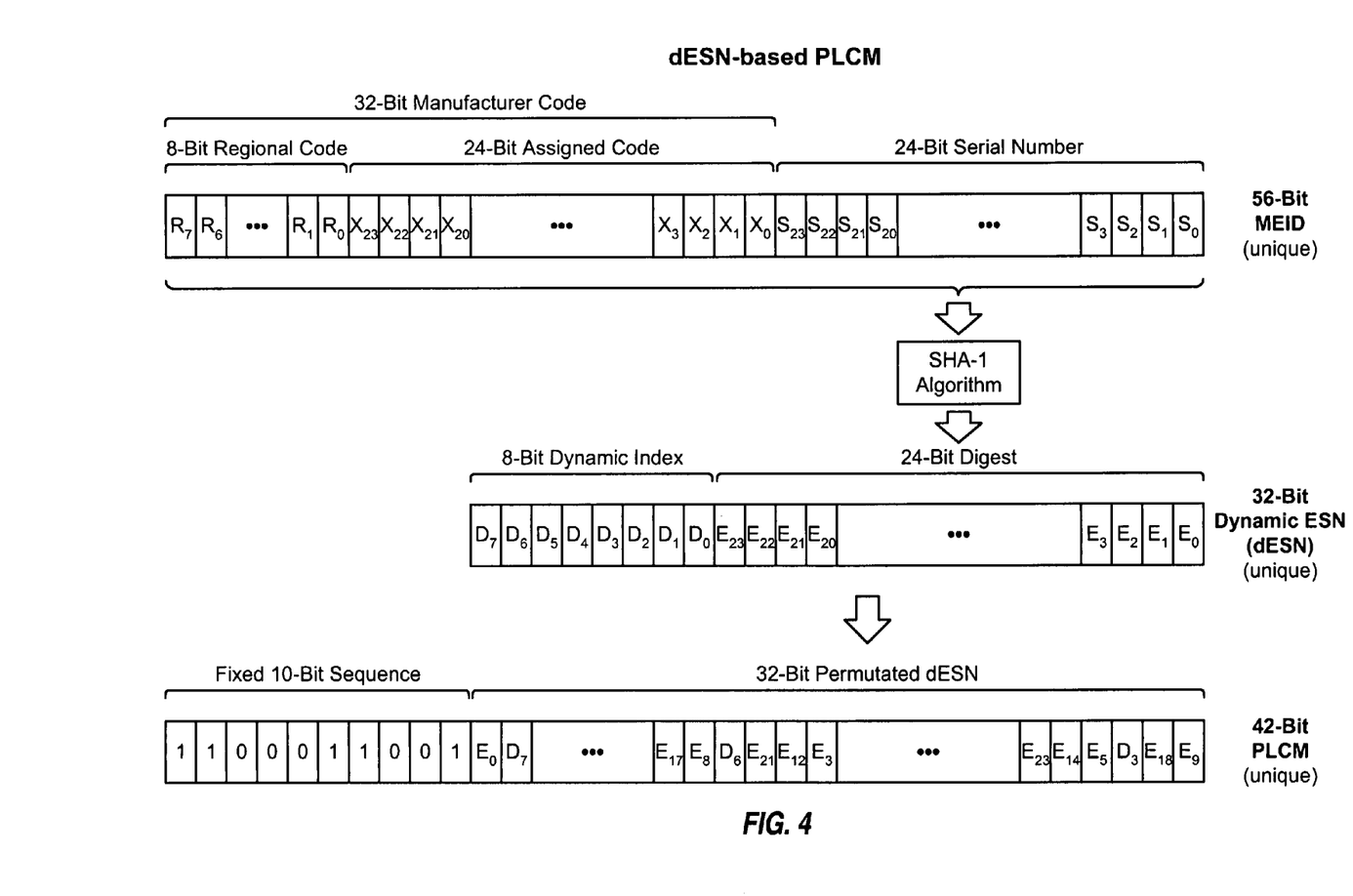
FIG. 4 shows a dynamic ESN (dESN) and a dESN-based PLCM.

FIG. 4 shows the generation of a 32-bit dESN based on a 56-bit MEID and a dynamic index. All 56 bits of the MEID are passed through the SHA-1 algorithm, which generates a 160-bit message digest. The 24 LSBs of the dESN are set to the 24 LSBs of the 160-bit message digest. The 8 MSBs of the dESN are set to an 8-bit value derived from the dynamic index. The dESN and pESN thus have the same lower 24 bits but different upper 8 bits since the upper 0x80 byte of the pESN is replaced by the dynamic index-based value. The dESN is unique among the ESNs for all wireless devices communicating with the base station.

FIG. 4 also shows the generation of a 42-bit PLCM based on the 32-bit dESN using a dESN-based PLCM scheme. The dESN may be used to generate the PLCM in the manner described above for FIG. 2 and also shown in FIG. 4. The 10 MSBs of the PLCM generated with the dESN may be set to either (1) the same fixed 10-bit sequence used for a PLCM generated based on a tESN or a pESN (not shown in FIG. 4), or (2) a different fixed 10-bit sequence to indicate that the PLCM is generated based on a dESN, as shown in FIG. 4. The different fixed 10-bit sequence may be obtained by changing one of the 10 bits (e.g., the LSB) in the fixed 10-bit sequence shown in FIG. 3. A dESN may collide with another ESN, and the different fixed 10-bit sequence may be used to distinguish between the dESN and the other ESN. In any case, the PLCM generated from the dESN is unique among the PLCMs for all wireless devices communicating with the base station because of the unique dESN.

In general, the dynamic indices assigned by a base station may be any values that can ensure that the dESNs generated with these dynamic indices are unique for all wireless devices communicating with the base station. For example, the dynamic indices may be values that are (1) selected systematically, (2) derived based on one or more parameters, (3) derived based on some known information, (4) selected randomly and checked for uniqueness, and so on. As an example, a base station may maintain a list of all possible dynamic indices and may keep track of which dynamic indices have been assigned and which dynamic indices are available for assignment. The base station may then assign the available dynamic indices whenever needed.

A base station may assign dynamic indices to the wireless devices in various manners. In one embodiment, the base station assigns unique dynamic indices to only wireless devices communicating with the base station and having non-unique pESNs. For this embodiment, the base station assigns dynamic indices to only wireless devices that collide. A wireless device typically sends its ESN or MEID and its IMSI to the base station during registration. The base station can then determine whether the wireless device collides with other wireless devices communicating with the base station. In another embodiment, the base station assigns unique dynamic indices to all wireless devices communicating with the base station regardless of whether these wireless devices have unique or non-unique pESNs. For all embodiments, the base station keeps track of all dynamic indices that have been assigned to the wireless devices and ensures that the assigned dynamic indices are unique.

The base station may assign dynamic indices to the wireless devices at various times. For example, the base station may assign a dynamic index to a wireless device during registration. The base station may also assign a dynamic index to a wireless device when a traffic channel is being established between the base station and the wireless device. The traffic channel may be established when the wireless device (1) originates a call with the base station or (2) is handed off from another base station to this base station. The base station may de-assign the dynamic index when the traffic channel is de-assigned, which may occur when the wireless device (1) terminates the call with this base station or (2) is handed off to another base station. The base station may also assign a dynamic index to the wireless device at other times and/or in other scenarios.

In general, the dynamic indices may be of any size, subject to the unique dESN criterion. For example, the dynamic indices may be 8-bit values, more than 8 bit values, or even less than 8 bit values. In an embodiment, the dynamic index is an 8-bit value that can be mapped directly to the 8 MSBs of the dESN. The 8-bit dynamic index can cover the maximum number of traffic channels that a base station can support for a given CDMA frequency in a wireless network that supports IS-2000 Release 0, A or B. Each of the traffic channels supported by the base station may be associated with a different 8-bit dynamic index. Each wireless device may be assigned the dynamic index for the traffic channel assigned to that wireless device.

In an embodiment, the dynamic index is implicit and generated based on one or more parameters that are known by both the base station and the wireless device. An implicit dynamic index may be generated in various manners. For example, the dynamic index may be equal to an 8-bit traffic channel number, which is denoted as CODE_CHAN in IS-2000. In this case, the dynamic index may be automatically assigned and de-assigned since the CODE_CHAN is unique for all wireless devices communicating with the base station at any given moment. If both the base station and the wireless device can derive an implicit dynamic index based on known information and/or existing signaling, then the base station does not need to explicitly send the dynamic index over the air to the wireless device. The use of implicit dynamic indices simplifies operation at both the base station and the wireless devices and also reduces overhead signaling during call setup and handoff.

In another embodiment, the dynamic index is explicit and is sent by the base station to the wireless device. This embodiment provides flexibility in the generation and assignment of the dynamic index. The base station may send the dynamic index to the wireless device via a signaling message, e.g., at the start of a call when a traffic channel is being established. This signaling message may be a Channel Assignment Message in IS-2000 or some other message.

In yet another embodiment, the dynamic index may be implicit or explicit depending on the operating scenario. A dynamic index may be generated in a predetermined manner and may be implicitly assigned to the wireless device if this implicit dynamic index is unique. If the implicit dynamic index is not unique, then another dynamic index may be explicitly assigned to the wireless device. The implicit dynamic index may thus be used if possible, and the explicit dynamic index may be used if needed.

For both implicit and explicit dynamic indices, the base station and the wireless device have knowledge of the dynamic index and the dESN generated with the dynamic index. The dESN may be used to (1) generate the PLCM as described above in FIG. 4 and (2) establish the traffic channel between the base station and the wireless device.

Base stations that support dESN (which are simply called "new base stations" in the description below) may be deployed along with base stations that do not support dESN (which are simply called "legacy base stations"). The new base stations may broadcast messages or indications to convey to the wireless devices that these base stations support dESN. For example, a new base station may advertise that it supports dESN by (1) setting a designated bit in a System Parameters Message (SPM) or an Extended System Parameters Message (ESPM) in IS-2000 or (2) sending an indication in some other message or in some other manner. The designated bit may be sent in an existing field or a new field in the SPM and ESPM.

A new base station may send to a wireless device (e.g., during traffic channel establishment) the following: (1) a dynamic index used to generate a dESN and/or (2) a PLCM indicator that indicates whether to use a dESN-based PLCM or some other type of PLCM. For a new call, the new base station may send the dynamic index in a DYNAMIC_INDEX field and/or the PLCM indicator in a USE_DYNAMIC_ESN-_BASED_PLCM field of an Extended Channel Assignment Message (ECAM) in IS-2000. For a handoff, the new base station may send the dynamic index and/or the PLCM indicator in a Universal Handoff Direction Message (UHDM) in IS-2000. The formats of the ECAM and UHDM may be modified to include the DYNAMIC_INDEX field and the USE_DYNAMIC_ESN_BASED_PLCM field. The new base station may also send the dynamic index and PLCM indicator in some other fields and/or in some other messages.

A new base station may communicate with both wireless devices that support dESNs (which are simply called "new wireless devices") and wireless devices that do not support dESNs (which are simply called "legacy wireless devices"). A new wireless device may send a dESN indicator to indicate that the wireless device supports dESN. The new wireless device may send this indicator in a Registration Message when registering with the base station, in an Origination Message when originating a call with the base station, and/or in a Page Response Message when responding to a page message from the base station (e.g., for a handoff or a network-initiated call). These messages are sent on an access channel and the PLCM (which is used for a traffic channel) is not needed to send these messages. The dESN indicator may be sent in an existing field or a new field in any of these messages. Alternatively, the new base station may assume that all wireless devices that are assigned MEIDs also support dESNs. In this case, the new wireless devices do not need to send the dESN indicator to the base station.

Figure 5:
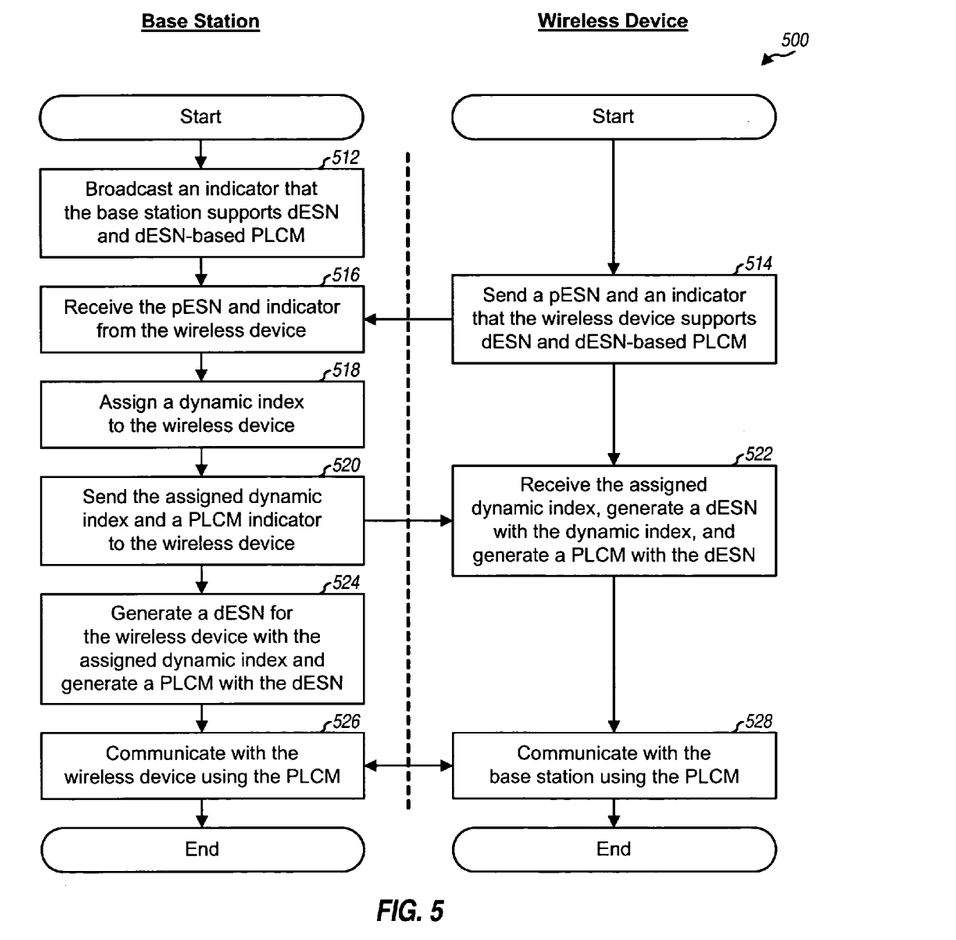
FIG. 5 shows a process performed by a base station and a wireless device for communication using dESN and dESN-based PLCM.

FIG. 5 shows a process 500 performed by a new base station and a new wireless device for communication using dESN and dESN-based PLCM. The base station may broadcast an indicator that it supports dESN and dESN-based PLCM, e.g., in the SPM and ESPM in IS-2000 (block 512). The wireless device may send a pESN (or its MEID) and an indicator that it supports dESN and dESN-based PLCM, e.g., in a Registration Message, an Origination Message, or a Page Response Message (block 514). The base station receives the pESN (or MEID) and the indicator from the wireless device (block 516). The base station then explicitly or implicitly assigns a dynamic index to the wireless device (block 518). If the dynamic index is explicit, then the base station sends the assigned dynamic index and a PLCM indicator to the wireless device (block 520).

The wireless device receives the assigned dynamic index from the base station, generates a dESN with the assigned dynamic index and its pESN, and further generates a PLCM with the dESN (block 522). Correspondingly, the base station generates a PLCM for the wireless device with the assigned dynamic index and the pESN for the wireless device (block 524). Thereafter, the base station and the wireless device communicate using the dESN and the PLCM generated with the dESN (blocks 526 and 528).

A new wireless device may be handed off from a first base station to a second base station. The first base station may or may not support dESN, and the second base station may or may not support dESN. If the first base station does not support dESN and the second base station supports dESN, then the second base station may use the UHDM to send a dynamic index and to instruct the wireless device to switch to dESN-based PLCM. If the first and second base stations both support dESNs, then the second base station may use the UHDM to send a new dynamic index and to instruct the wireless device to continue to use dESN-based PLCM. If the first base station supports dESN and the second base station does not support dESN, then the second base station does not send a new dynamic index or a PLCM indicator. In one embodiment, the wireless device automatically switches from dESN-based PLCM to pESN-based PLCM if a new dynamic index or a PLCM indicator is not received from the second base station. In another embodiment, the wireless device is directed to switch to pESN-based PLCM, e.g., by the UHDM. The wireless device would then encounter a possibility of collision with another wireless device while communicating with the second base station. If both the first and second base stations do not support dESN, then the wireless device would know to continue to use pESN-based PLCM and would again encounter a possibility of collision with another wireless device.

For simplicity, much of the description above is for communication between a base station and a wireless device. In general, the dynamic indices may be selected and assigned to ensure unique ESNs for (1) all wireless devices communicating with a single base station, (2) all wireless devices communicating with a group of neighboring base stations, (3) all wireless devices communicating with base stations under the control of a mobile switching center, (4) all wireless devices communicating with some other combination of base stations, or (5) all wireless devices in the network. If unique ESNs are desired for two or more base stations, then these base stations may communicate to ensure that dynamic indices are appropriately assigned. Unique ESNs for wireless devices communicating with a large group of base stations may be achieved, for example, by assigning dynamic indices only when collisions are detected.

The dynamic index may be assigned at various times, e.g., during registration, during call establishment, during handoff, and so on. The dynamic index may be conveniently assigned during registration via signaling sent for registration. However, the wireless device may not transmit on the traffic channel thereafter, in which case the assigned dynamic index will not be used. The dynamic index may also be assigned only when needed during call establishment or handoff. The dynamic index may also be assigned for any time duration, e.g., for communication with a single base station, for an entire call even if the wireless device is handed off from one base station to another base station, and so on.

The techniques described herein may be used to generate a unique identifier for a wireless device based on an identifier provided by the wireless device and an index assigned by a base station. These techniques may be used for various wireless communication networks and various applications.

Figure 6:
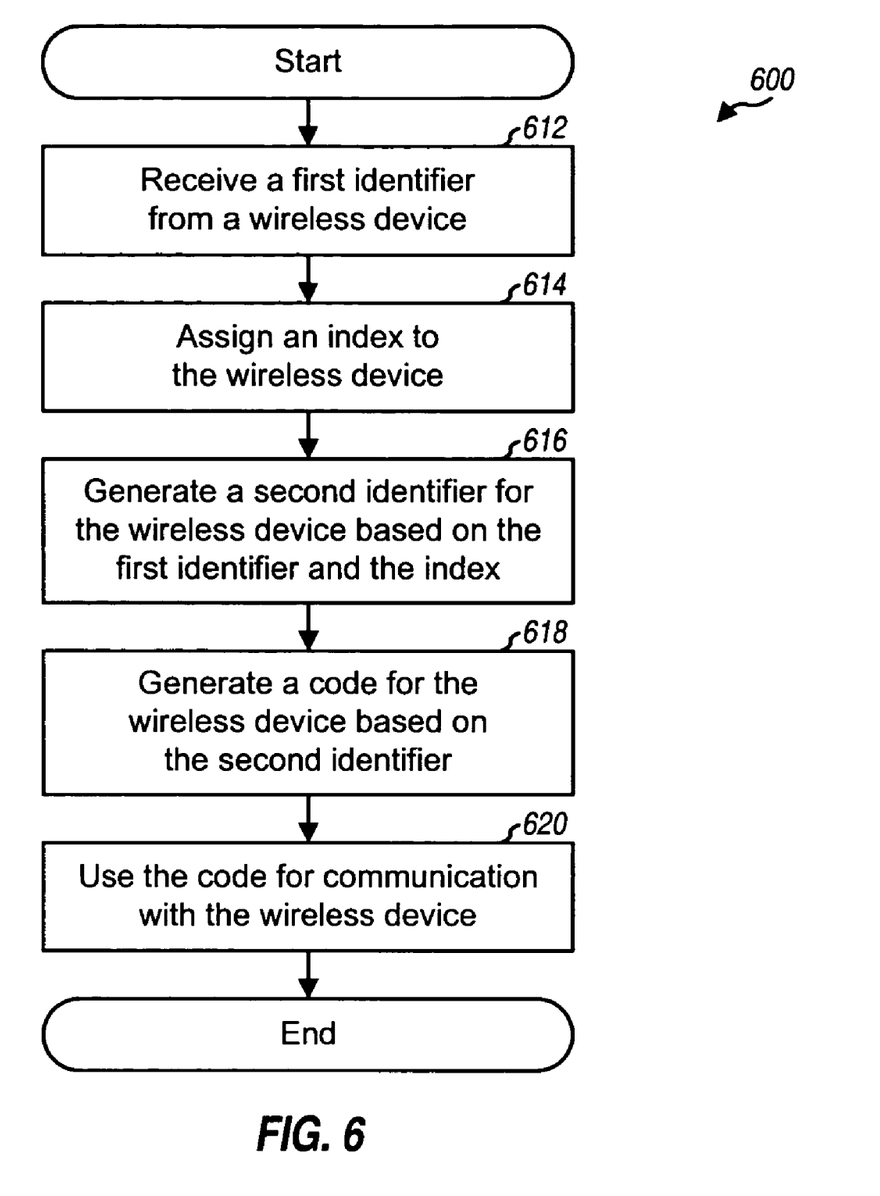
FIG. 6 shows a process to generate a unique identifier for a wireless device.

FIG. 6 shows a process 600 for generating a unique identifier for a wireless device. A base station receives a first identifier from the wireless device, which may be a pESN, a MEID, or some other type of identifier (block 612). An index is assigned to the wireless device (block 614). The index may be a selected value, a traffic channel number, or a value derived in some other manner. A second identifier for the wireless device is then generated based on the first identifier and the index (block 616). The second identifier is unique among all wireless devices communicating with the base station and may also be unique among other wireless devices communicating with other base stations. A code (e.g., a PLCM) may be generated for the wireless device based on the second identifier (block 618) and used for communication with the wireless device (block 620).

The techniques described herein may be used for scenarios in which the first identifier (e.g., an MEID) cannot ensure uniqueness for the second identifier (e.g., a pESN). The dynamic index may be used to ensure uniqueness. The techniques described herein may also be used for scenarios in which the first identifier is a temporary identifier that may not be unique. The techniques may also be used to hide a true identifier. For example, a wireless device may want to hide its true identifier (e.g., a true ESN) for whatever reason. The true ESN may be used like a pESN. A dynamic index may then be applied to this pESN to generate a temporary identifier that may be used for communication. The dynamic index ensures that the temporary identifier is unique while also hiding the true identifier. For all of the above scenarios, the techniques described herein can ensure uniqueness for the second identifier generated based on the temporary identifier.

Figure 7:
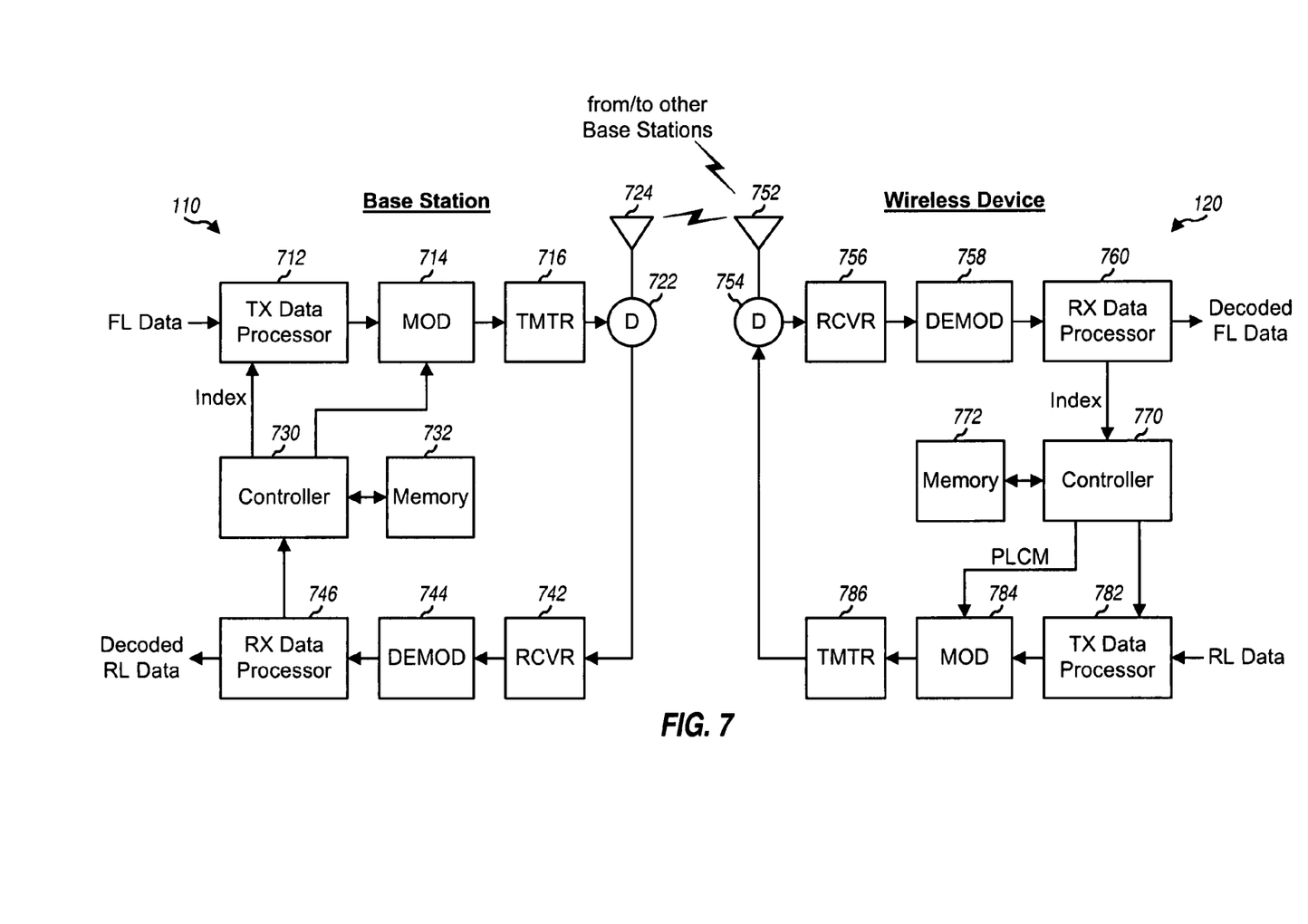
FIG. 7 shows a block diagram of a base station and a wireless device.

FIG. 7 shows a block diagram of a base station 110 and a wireless device 120. Base station 110 can communicate with multiple wireless devices simultaneously. For simplicity, the following description is for communication between base station 110 and wireless device 120.

On the forward link (FL), at base station 110, a transmit (TX) data processor 712 formats, encodes, and interleaves FL traffic data and signaling for wireless device 120. A modulator (MOD) 714 then channelizes, scrambles, and modulates the output of TX data processor 712 and provides a stream of data chips. The processing of data and signaling in cdma2000 is described in TIA/EIA/IS-2000.1 and other 3GPP2 documents. A transmitter unit (TMTR) 716 conditions (e.g., converts to analog, amplifies, filters, and frequency upconverts) the stream of data chips and generates a forward link signal. The forward link signal is routed through a duplexer (D) 722 and transmitted via an antenna 724 to wireless device 120.

At wireless device 120, the forward link signal is received by an antenna 752, routed through a duplexer 754, and provided to a receiver unit (RCVR) 756. Receiver unit 756 conditions (e.g., filters, amplifies, and frequency downconverts) the received signal and further digitizes the conditioned signal to generate samples. A demodulator (DEMOD) 758 descrambles, dechannelizes, and demodulates the samples and provides symbols. A receive (RX) data processor 760 deinterleaves and decodes the symbols, checks the decoded packets and messages, and provides decoded data. The processing by demodulator 758 and RX data processor 760 is complementary to the processing by modulator 714 and TX data processor 712, respectively.

On the reverse link (RL), at wireless device 120, RL traffic data and signaling are processed by a TX data processor 782, further processed by a modulator 784, conditioned by a transmitter unit 786, routed through duplexer 754, and transmitted via antenna 752. At base station 110, the reverse link signal from wireless device 120 is received by antenna 724, routed through duplexer 722, conditioned by a receiver unit 742, processed by a demodulator 744, and further processed by an RX data processor 746 to recover the RL data and signaling from wireless device 120.

Controllers 730 and 770 control the operation at base station 110 and wireless device 120, respectively. Memory units 732 and 772 store data and codes used by controllers 730 and 770, respectively.

For dESN and PLCM generation in cdma2000, base station 110 broadcasts its dESN capability via broadcast messages or some other means, assigns dynamic indices to wireless devices as appropriate, sends dynamic indices and/or PLCM indicators to the wireless devices if necessary, generates dESNs for these wireless devices based on the assigned dynamic indices and the identifiers (e.g., MEIDs or pESNs) provided by the wireless devices, and further generates PLCMs for the wireless devices based on the dESNs. Base station 110 may maintain a list of assigned dynamic indices in memory unit 732 and ensure that the assigned dynamic indices are unique. Wireless device 120 sends its dESN capability via signaling message, receives the assigned dynamic index, generates a dESN based on the assigned dynamic index and its identifier (e.g., MEID or pESN), and further generates a PLCM based on the dESN. Both base station 110 and wireless device 120 use the PLCM for wireless communication and may use the dESN for other purposes.

For clarity, the techniques have been described mainly for cdma2000. As noted above for FIG. 6, these techniques may also be used for other types of wireless networks, which may implement other CDMA, TDMA and/or FDMA RATs and standards.

The techniques described herein may be implemented by various means. For example, these techniques may be implemented in hardware, software, or a combination thereof. For a hardware implementation, the processing units used to generate unique identifiers at a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to generate a unique identifier at a wireless device may also be implemented within one or more ASICs, DSPs, processors, electronic devices, and so on.

For a software implementation, the techniques may be implemented with modules (e.g., procedures, functions, and so on) that perform the functions described herein. The software codes may be stored in a memory unit (e.g., memory unit 732 or 772 in FIG. 7) and executed by a processor (e.g., controller 730 or 770). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of generating an identifier in a wireless communication network, comprising:
   receiving a pseudo Electronic Serial Number (ESN) from a wireless device;
   a base station assigning a unique index to the wireless device, wherein the unique index is different from all other unique indices assigned by the base station to other wireless devices;
   generating a dynamic Electronic Serial Number (ESN) for the wireless device based on the pseudo ESN and the unique index, wherein the dynamic ESN is unique among all wireless devices communicating with the base station;
   generating a code for the wireless device based on the dynamic ESN; and
   using the code for communication with the wireless device.

2. The method of claim 1, further comprising:
   selecting the unique index such that the dynamic ESN for the wireless device is unique among dynamic ESNs for all wireless devices communicating with the base station.

3. The method of claim 1, further comprising:
   selecting the unique index such that the dynamic ESN for the wireless device is unique among dynamic ESNs for all wireless devices communicating with the base station and at least one other base station.

4. The method of claim 1, further comprising:
   broadcasting an indication that the base station supports use of the unique index.

5. The method of claim 1, further comprising:
   receiving an indication that the wireless device supports use of the unique index, and wherein the assigning the unique index and the generating the dynamic ESN are performed after receiving the indication.

6. The method of claim 1, wherein the assigning the unique index to the wireless device comprises the assigning the unique index to the wireless device when the wireless device originates a call with the base station or is handed off to the base station.

7. The method of claim 1, wherein the assigning the unique index to the wireless device comprises the assigning the unique index to the wireless device when the wireless device registers with the base station.

8. The method of claim 1, further comprising:
   sending the unique index to the wireless device via a signaling message.

9. The method of claim 1, wherein the unique index is implicitly assigned and not sent to the wireless device.

10. An apparatus comprising:
    a receiver unit configured to receive a pseudo Electronic Serial Number (ESN) from a wireless device; and
    a controller configured to assign a unique index to the wireless device and to generate a dynamic Electronic Serial Number (ESN) for the wireless device based on the pseudo ESN and the unique index, wherein the unique index is different from all other unique indices assigned by a base station to other wireless devices, and the dynamic ESN is unique among all wireless devices communicating with the base station, and wherein the controller is further configured to generate a code for the wireless device based on the dynamic ESN and to use the code for communication with the wireless device.

11. The apparatus of claim 10, wherein the controller is configured to select the unique index such that the dynamic ESN for the wireless device is unique among dynamic ESNs for all wireless devices communicating with the base station.

12. An apparatus comprising:
    means for receiving a pseudo Electronic Serial Number (ESN) from a wireless device;
    means for assigning a unique index to the wireless device, wherein the unique index is different from all other unique indices assigned to other wireless devices by the means for assigning a unique index;
    means for generating a dynamic Electronic Serial Number (ESN) for the wireless device based on the pseudo ESN and the unique index, wherein the dynamic ESN is unique among all wireless devices communicating with a base station;
    means for generating a code for the wireless device based on the dynamic ESN; and
    means for using the code for communication with the wireless device.

13. The apparatus of claim 12, further comprising:
    means for selecting the unique index such that the dynamic ESN for the wireless device is unique among dynamic ESNs for all wireless devices communicating with the base station.

14. A method of generating an identifier in a wireless communication network, comprising:
    receiving a pseudo Electronic Serial Number (ESN) for a wireless device;
    a base station assigning a unique index to the wireless device, wherein the unique index is different from all other unique indices assigned by the base station to other wireless devices;
    generating a dynamic ESN for the wireless device based on the pseudo ESN and the unique index, wherein the dynamic ESN is unique among all wireless devices communicating with a base station;
    generating a Public Long Code Mask (PLCM) for the wireless device based on the dynamic ESN; and
    using the PLCM for communication with the wireless device.

15. The method of claim 14, further comprising:
    sending to the wireless device an indication to use the PLCM generated based on the dynamic ESN.

16. The method of claim 14, further comprising:
    assigning a traffic channel to the wireless device, and wherein the unique index is a traffic channel number for the traffic channel assigned to the wireless device.

17. A method of generating an identifier in a wireless communication network, comprising:
    sending to a base station a pseudo Electronic Serial Number (ESN) for a wireless device;
    receiving from the base station a unique index assigned by the base station to the wireless device, wherein the unique index is different from all other unique indices assigned by the base station to other wireless devices;

generating a dynamic Electronic Serial Number (ESN) for the wireless device based on the pseudo ESN and the unique index, wherein the dynamic ESN is unique among all wireless devices communicating with the base station;

generating a code for the wireless device based on the dynamic ESN; and using the code for communication with the base station.

18. The method of claim 17, further comprising:
sending to the base station an indication that the wireless device supports use of the unique index.

19. The method of claim 17, further comprising:
using the unique index for an entire call even if the wireless device is handed off to a second base station.

20. The method of claim 17, wherein the code is a Public Long Code Mask (PLCM).

21. The method of claim 17, further comprising:
deriving the pseudo ESN based on a Mobile Equipment Identifier (MEID) assigned to the wireless device.

22. An apparatus, comprising:
a transmitter unit configured to send to a base station a pseudo Electronic Serial Number (ESN) for a wireless device;
a receiver unit configured to receive from the base station a unique index assigned by the base station to the wireless device, wherein the unique index is different from all other unique indices assigned by the base station to other wireless devices; and
a controller configured to generate a dynamic Electronic Serial Number (ESN) for the wireless device based on the pseudo ESN and the unique index, wherein the dynamic ESN is unique among all wireless devices communicating with the base station, and wherein the controller is further configured to generate a code for the wireless device based on the dynamic ESN and to use the code for communication with the base station.

23. The apparatus of claim 22, wherein the controller is configured to derive the pseudo ESN based on a Mobile Equipment Identifier (MEID) assigned to the wireless device.

24. The apparatus of claim 22, wherein the code is a Public Long Code Mask (PLCM).

25. An apparatus, comprising:
means for sending to a base station a pseudo Electronic Serial Number (ESN) for a wireless device;
means for receiving from the base station a unique index assigned by the base station to the wireless device, wherein the unique index is different from all other unique indices assigned by the base station to other wireless devices;
means for generating a dynamic Electronic Serial Number (ESN) for the wireless device based on the pseudo ESN and the unique index, wherein the dynamic ESN is unique among all wireless devices communicating with the base station;
means for generating a code for the wireless device based on the dynamic ESN; and
means for using the code for communication with the base station.

26. The apparatus of claim 25, wherein the apparatus is an integrated circuit.

27. The apparatus of claim 25, wherein the code is a Public Long Code Mask (PLCM).

28. The apparatus of claim 25, wherein the pseudo ESN is derived based on a Mobile Equipment Identifier (MEID) assigned to the wireless device.

29. The apparatus of claim 25, further comprising:
mean for sending to the base station an indication that the wireless device supports use of the unique index.

* * * * *